US008453622B2

(12) United States Patent
Iwaoka et al.

(10) Patent No.: US 8,453,622 B2

(45) Date of Patent: Jun. 4, 2013

(54) FUEL SUPPLY SYSTEM

(75) Inventors: Shin Iwaoka, Kariya (JP); Norihiro Hayashi, Okazaki (JP); Masakazu Suzuki, Kariya (JP)

(73) Assignee: Kyosan Denki Co., Ltd., Koga (JP)

( * ) Notice: Subject to any disclaimer, the term of this patent is extended or adjusted under 35 U.S.C. 154(b) by 1114 days.

(21) Appl. No.: 12/382,397

(22) Filed: Mar. 16, 2009

(65) Prior Publication Data

US 2009/0241912 A1 Oct. 1, 2009

(30) Foreign Application Priority Data

Mar. 28, 2008 (JP) ................................ 2008-086596
Feb. 17, 2009 (JP) ................................ 2009-034576

(51) Int. Cl.

*F02M 37/04* (2006.01)
*B67D 7/70* (2010.01)
*F04B 41/06* (2006.01)
*B01D 29/00* (2006.01)

(52) U.S. Cl.

USPC .................. 123/509; 137/565.29; 210/172.4; 210/416.4

(58) Field of Classification Search

USPC ......... 123/509, 495, 497, 198 C; 137/565.29; 210/172.4, 416.4, 191, 258, 416.1
See application file for complete search history.

(56) References Cited

U.S. PATENT DOCUMENTS

| | | | | |
|---|---|---|---|---|
| 3,900,397 | A * | 8/1975 | Bell | 210/128 |
| 5,547,568 | A * | 8/1996 | Sasaki | 210/172.4 |
| 6,102,011 | A * | 8/2000 | Meyer et al. | 123/509 |
| 7,114,490 | B2 * | 10/2006 | Zdroik | 123/497 |
| 7,500,473 | B2 * | 3/2009 | Kobayashi et al. | 123/509 |
| 7,628,143 | B2 * | 12/2009 | Yamada et al. | 123/509 |
| 2003/0131828 | A1 * | 7/2003 | Crary | 123/509 |
| 2004/0118764 | A1 * | 6/2004 | Miller et al. | 210/258 |
| 2011/0011373 | A1 * | 1/2011 | Shimura et al. | 123/497 |

FOREIGN PATENT DOCUMENTS

JP 2012017691 A * 1/2012

* cited by examiner

*Primary Examiner* — Mahmoud Gimie
*Assistant Examiner* — David Hamaoui
(74) *Attorney, Agent, or Firm* — Oliff & Berridge, PLC

(57) ABSTRACT

A fuel supply system includes a plurality of fuel pumps, and one suction filter. The suction filter includes connection portions that are connected to pump inlets of the fuel pumps, and an interval adjusting member that adjusts the interval between the connection portions in accordance with the interval between the fuel pumps. Thus, it is possible to fit the suction filter to the fuel pumps without changing the interval between the fuel pumps. Because the interval between pump outlets is not changed, it is possible to minimize the problems that are likely to occur when the suction filter is fitted to the fuel pumps.

19 Claims, 11 Drawing Sheets

FUEL SUPPLY SYSTEM

INCORPORATION BY REFERENCE

The disclosure of Japanese Patent Application No. 2008-086596 filed on Mar. 28, 2008 including the specification, drawings and abstract is incorporated herein by reference in its entirety.

BACKGROUND OF THE INVENTION

1. Field of the Invention

The invention relates to an in-tank type fuel supply system that includes a plurality of fuel pumps.

2. Description of the Related Art

Fuel pumps have become more compact to meet the demand for lighter vehicles. However, when an output from an internal combustion engine that is mounted in, for example, a sports car needs to be improved, the performance of the fuel pump needs to be enhanced to supply a larger amount of fuel to the internal combustion engine. In this case, a larger fuel pump may be employed. However, instead of using a larger fuel pump, a plurality of compact fuel pumps may be used to supply a required amount of fuel to the internal combustion engine. Using a plurality of compact fuel pumps is more advantageous to commonality of components and cost reduction.

A suction filter may be fitted to an inlet-side portion of a fuel pump that is provided in a fuel tank. Even if there are multiple fuel pumps, preferably only one suction filter is provided so that the fuel in the fuel tank is taken into the fuel pumps at high efficiency. When only one suction filter is fitted to the inlet-side portions of the multiple fuel pumps, the interval between the fuel pumps is likely to be influenced by the interval between connection portions of the suction filter (refer to, for example, U.S. Pat. No. 7,114,490B2). If one suction filter that has connection portions, the interval between which is fixed, is fitted to, for example, two fuel pumps, the interval between the fuel pumps is changed in accordance with the interval between the connection portions of the suction filter. Accordingly, seal portions, which provide sealing between outlets of the fuel pumps and a fuel pump holding member, may be tilted or twisted. As a result, problems such as degradation of sealing performance may be caused.

SUMMARY OF THE INVENTION

The invention provides a fuel supply system in which a suction filter is fitted to a plurality of fuel pumps without a change in the interval between the fuel pumps.

An aspect of the invention relates to a fuel supply system that includes a plurality of fuel pumps and one suction filter. In the fuel supply system, connection portions of the suction filter are connected to pump inlets of the fuel pumps. The suction filter includes an interval adjusting member that adjusts the interval between the connection portions of the suction filter in accordance with the interval of the fuel pumps. Thus, it is possible to fit the suction filter to the fuel pumps without changing the interval between the fuel pumps. Because the interval between pump outlets of the fuel pumps is not changed, it is possible to avoid problems that are likely to occur when the suction filter is fitted to the fuel pumps. For example, in a structure in which sealing members provide sealing between the pump outlets and a fuel pump holding member, degradation of sealing between the pump outlets and the fuel pump holding member is prevented.

In the aspect of the invention described above, the interval adjusting member may be an arm that connects one of the connection portions of the suction filter to a shape maintaining member. Thus, the interval between the connection portions of the suction filter is adjusted relatively easily.

In the structure described above, the arm that connects the connection portion of the suction filter to the shape maintaining member may be formed into a specific shape that is selected in such a manner that a portion of the arm, which is between the connection portion and the shape maintaining member, is longer than the shortest distance between the connection portion and the shape maintaining member. That is, the arm may be a nonlinear member. For example, the arm may be formed into an L-shape, a hook shape or a spring shape. Thus, the interval between the connection portions of the suction filter is adjusted relatively easily.

In the structure described above, the arm may be formed of a plurality of small arms, and the adjacent arms may be connected to each other with a joint. For example, the arm may be formed of an upper arm that is connected to the shape maintaining member and a front arm that is connected to the connection portion, and the upper arm and the front arm may be movably connected to each other with a joint. In the structure described above, the arm may be made of flexible material. Thus, the interval between the connection portions of the suction filter is adjusted relatively easily.

In the aspect of the invention described above, a notch may be formed in a filter body of the suction filter at a position between the connection portions. Thus, the flexibility of the suction filter itself is increased and therefore the connection portions are moved more easily.

BRIEF DESCRIPTION OF THE DRAWINGS

The foregoing and further features and advantages of the invention will become apparent from the following description of example embodiments with reference to the accompanying drawings, wherein the same or corresponding portions will be denoted by the same reference numerals and wherein.

DETAILED DESCRIPTION OF THE EXAMPLE EMBODIMENTS

Figure 1:
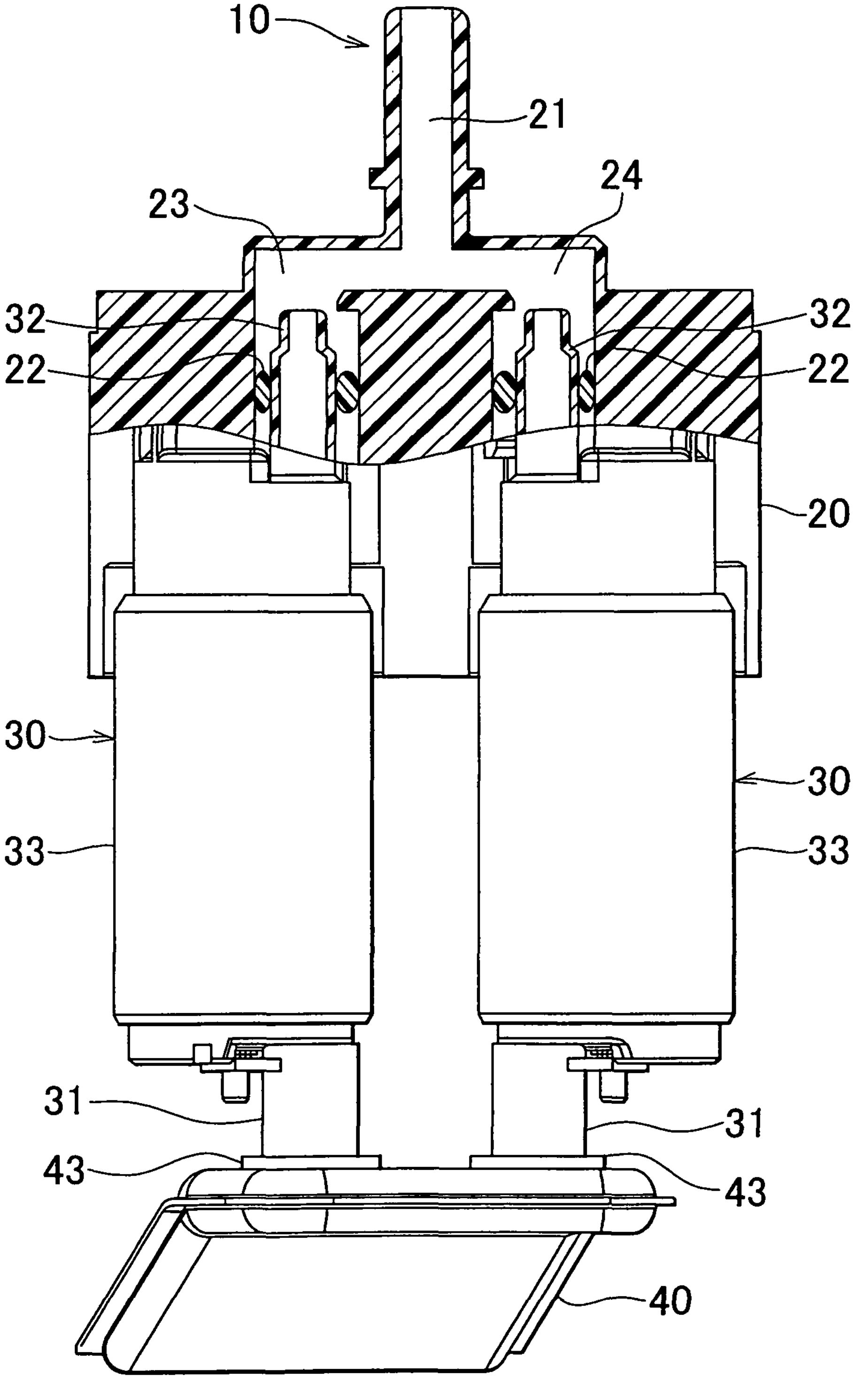
FIG. 1 is a partially cut-away view schematically showing a fuel supply system according to a first embodiment of the invention.
Figure 2:
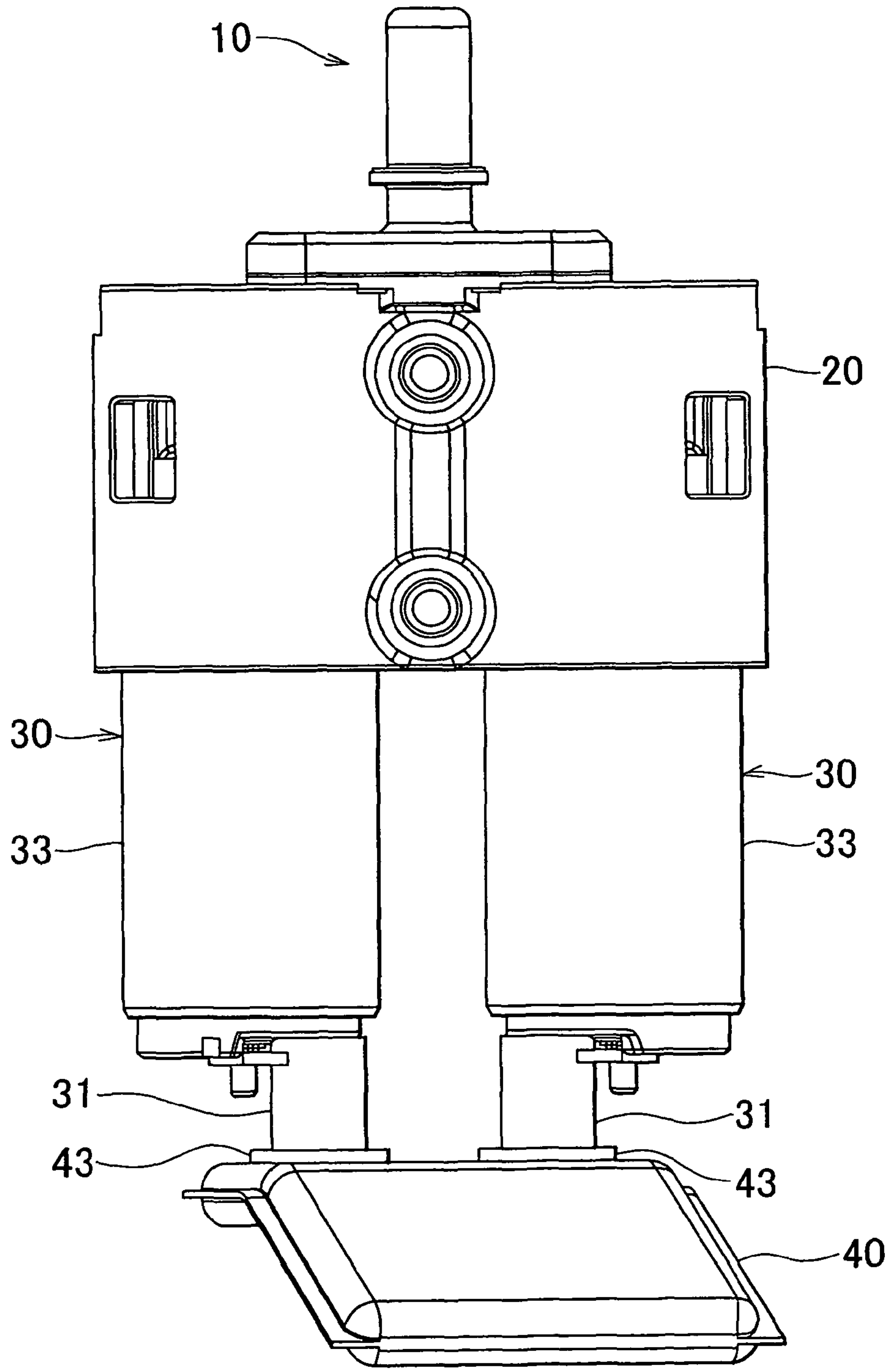
FIG. 2 is a front view showing the fuel supply system according to the first embodiment of the invention.
Figure 3:
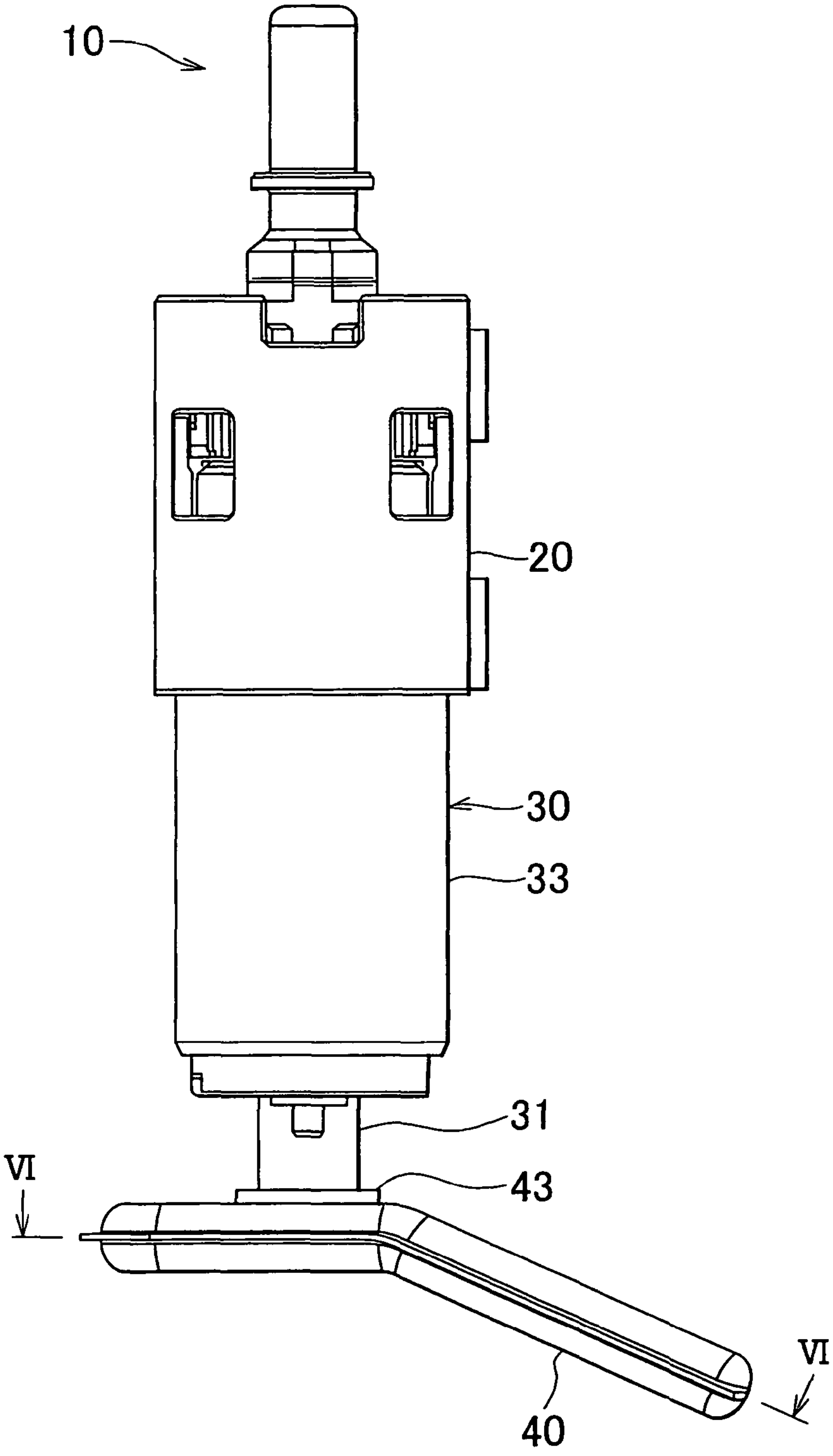
FIG. 3 is a side view showing the fuel supply system according to the first embodiment of the invention.
Figure 4:
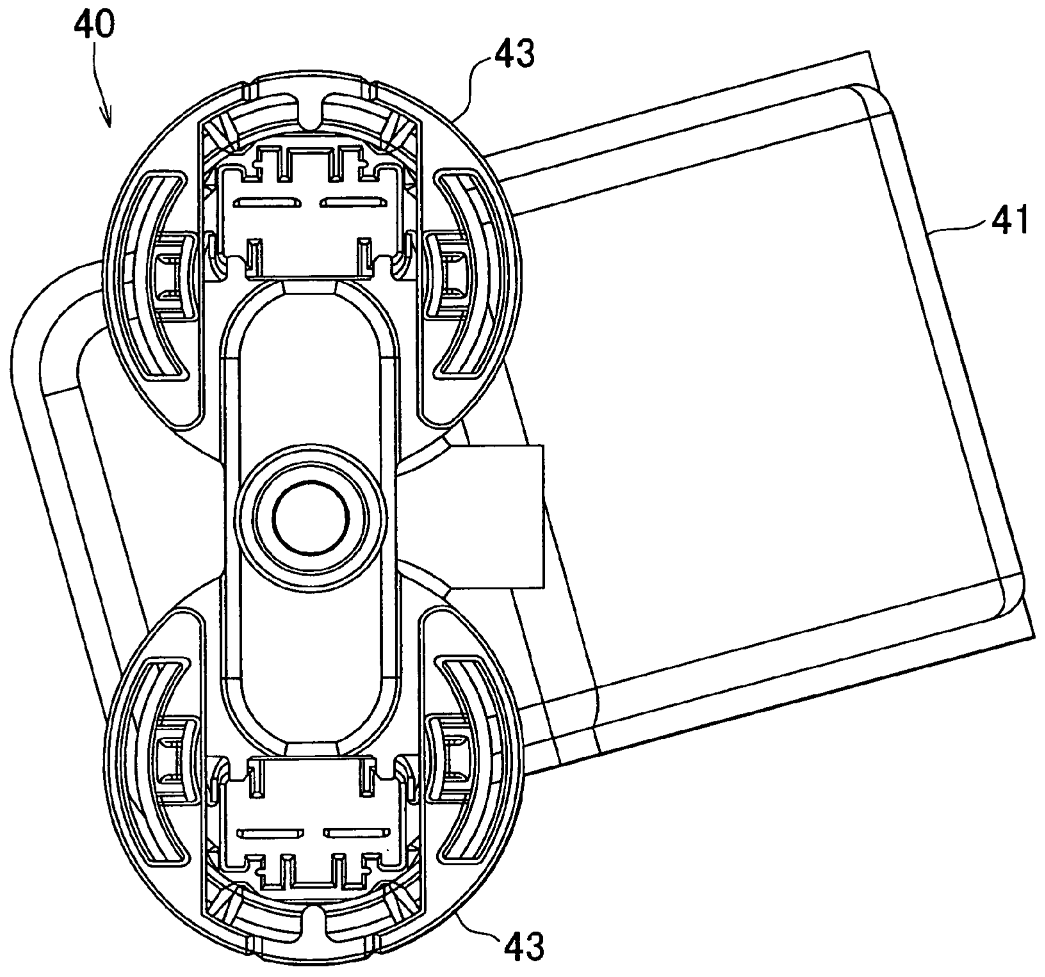
FIG. 4 is a top plan view showing a suction filter according to the first embodiment of the invention.
Figure 5:
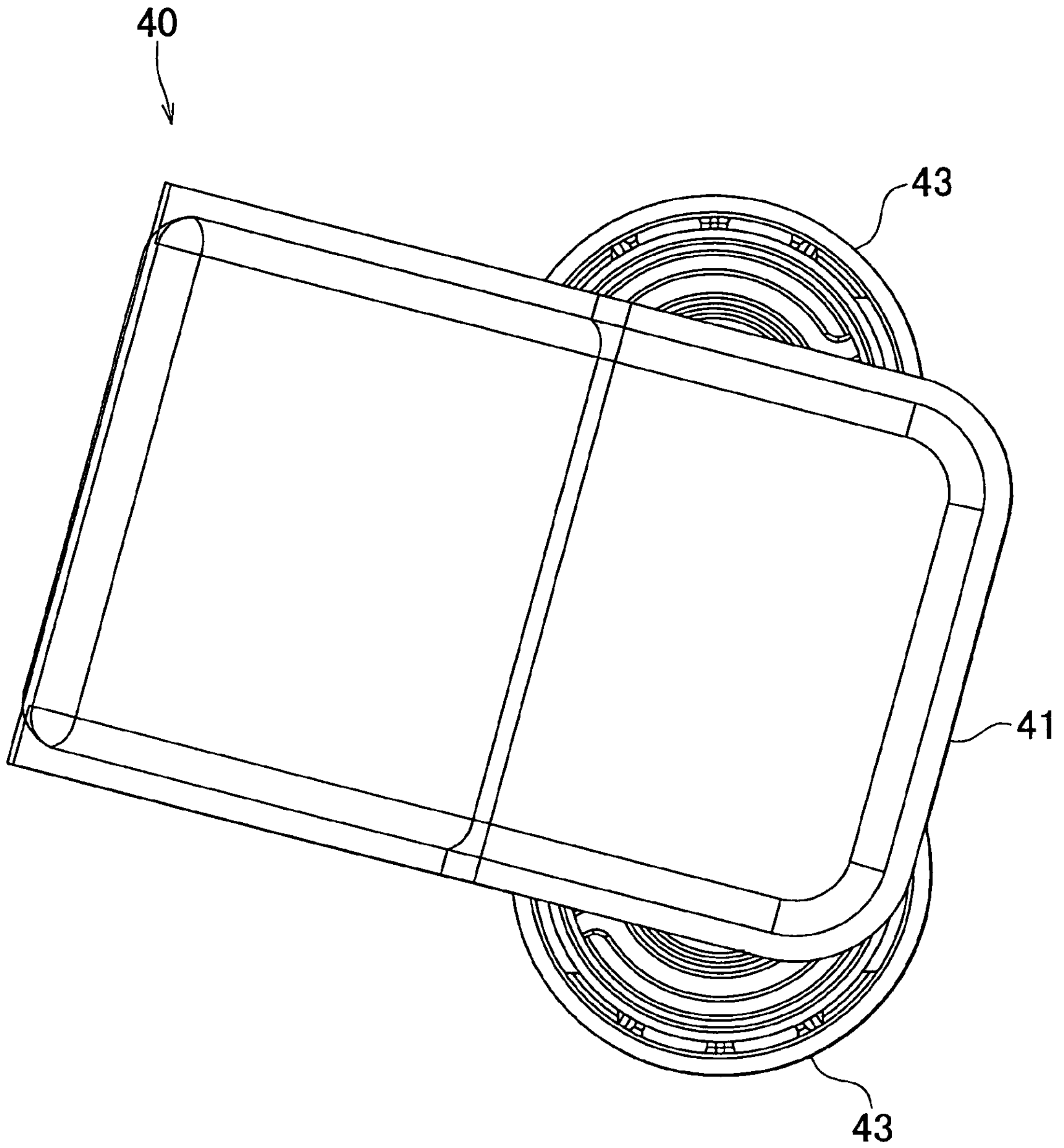
FIG. 5 is a bottom plan view showing the suction filter according to the first embodiment of the invention.
Figure 6:
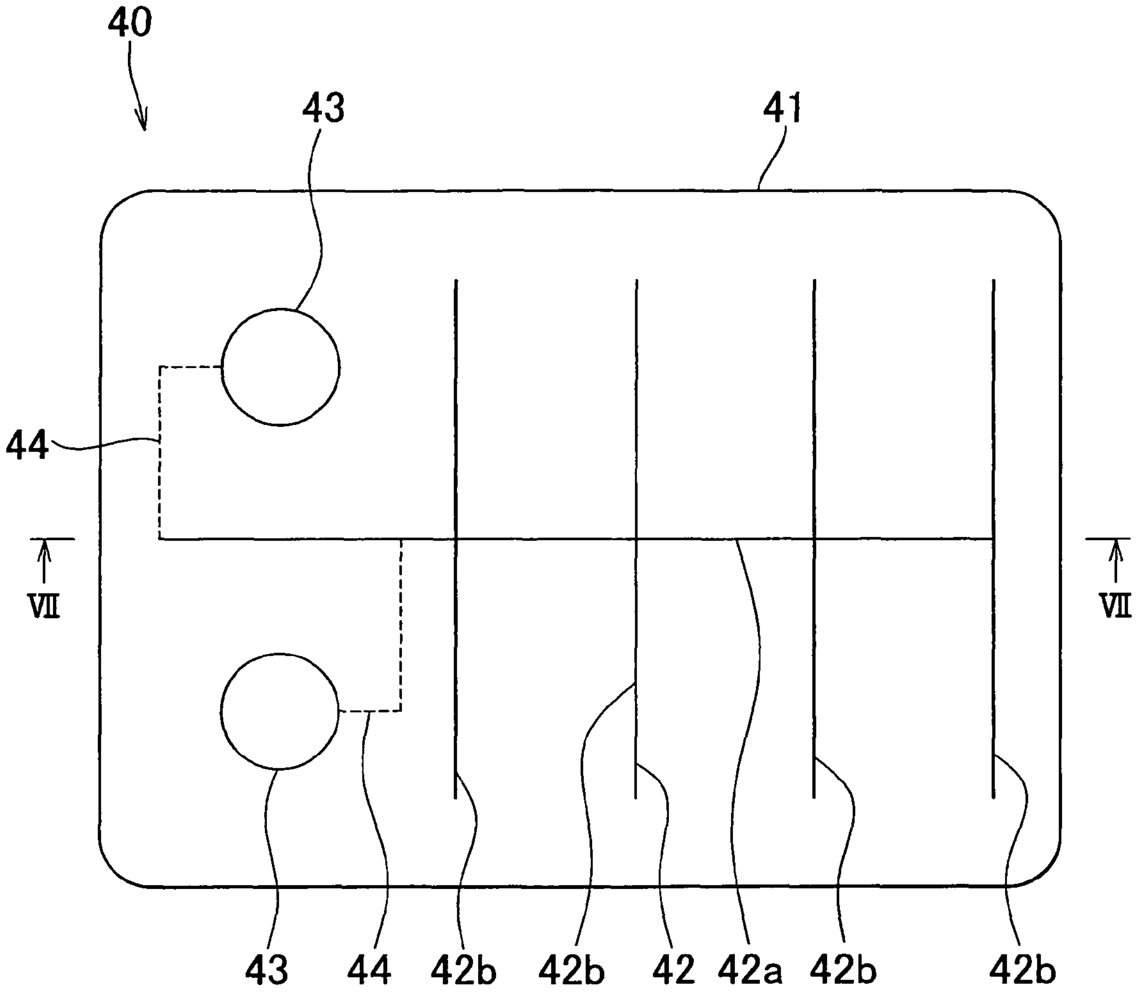
FIG. 6 is a schematic cross-sectional view taken along the line VI-VI in FIG. 3.
Figure 7:
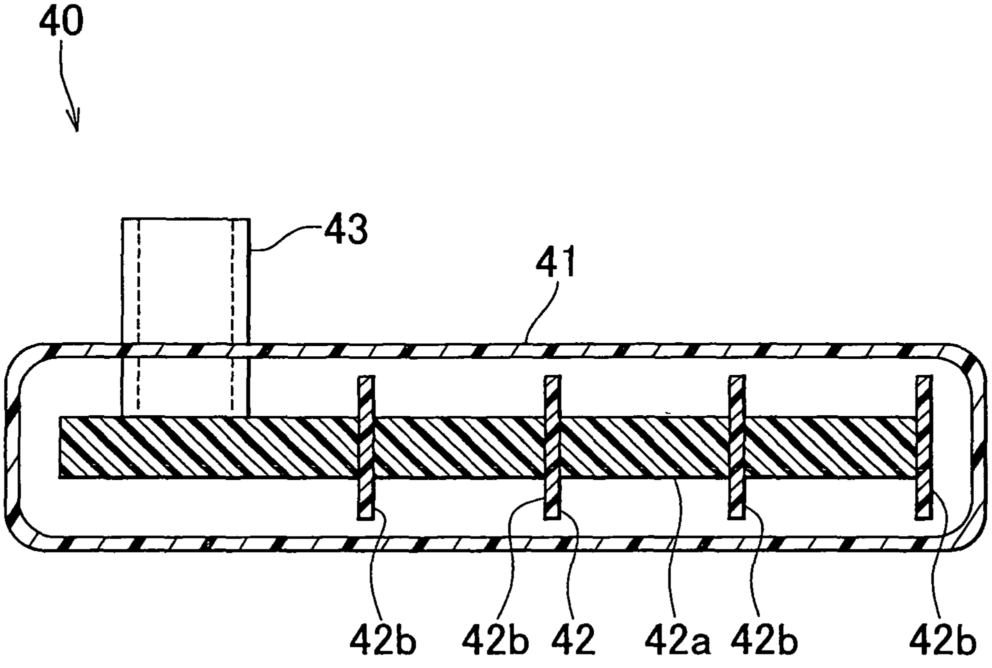
FIG. 7 is a schematic cross-sectional view taken along the line VII-VII in FIG. 6.

Hereafter, example embodiments of the invention will be described in detail with reference to the accompanying drawings. First, a first embodiment of the invention will be described below. FIGS. 1 to 3 show a fuel supply system 10 according to the first embodiment of the invention. The fuel supply system 10 is provided in a fuel tank, and supplies the fuel in the fuel tank to an internal combustion engine.

The fuel supply system 10 is formed of a fuel pump holding member 20, a plurality of fuel pumps 30, a suction filter 40, etc. The fuel pump holding member 20 holds the plurality of fuel pumps 30. The fuel pump holding member 20 has fuel chambers 23 and 24 into which the fuel discharged from the fuel pumps 30 flows, and a fuel passage 21 at which the fuel from the fuel chamber 23 and the fuel from the fuel chamber 24 are merged together and through which the fuel is supplied to the internal combustion engine. The fuel pumps 30 are driven by a motor (not shown). The fuel, which has passed through the suction filter 40, is taken into the fuel pumps 30 through inlets 31 that are used as pump inlets, the pressure of the fuel is boosted at pump portions 33, and the fuel is then discharged from outlets 32 that are used as pump outlets. The outlets 32 are communicated with the fuel chambers 23 and 24 of the fuel pump holding member 20, and O-rings 22 that serve as sealing members provide sealing between the outlets 32 and the fuel pump holding member 20. The fuel in the fuel tank (not shown) is taken into a filter body 41 (described later in detail). The fuel is filtered at the filter body 41 when flowing into the filter body 41. Then, the filtered fuel is discharged from the suction filter 40 and flows into the inlets 31 of the fuel pumps 30.

The suction filter 40 according to the first embodiment of the invention is shown in FIGS. 4 to 7. The suction filter 40 is fitted to the inlets 31 of the fuel pumps 30, and removes relatively large foreign matter from the fuel. The suction filter 40 includes a filter body 41, a shape maintaining member 42, two connection portions 43, and arms 44 that serve as interval adjusting members. The filter body 41 having a sac-shape is formed by folding mesh nonwoven fabric. The upper face of the filter body 41 is held between the connection portions 43 and the arms 44 and the outer periphery of the filter 41 is closed by thermal welding, whereby the filter body 41 is sealed. The shape maintaining member 42 is formed of a stem 42*a* and a plurality of branches 42*b* that are orthogonal to the stem 42*a*. The shape maintaining member 42 is made of resin, for example, polyacetal synthetic fabric, or polyamide synthetic fabric. The shape maintaining member 42 is housed in the sac-shaped filter body 41, and maintains the inner space that is defined by the sac-shaped filter body 41. The shape maintaining member 42 maintains the shape of the filter body 41 by preventing deflation of the filter body 41 due to fuel pressure generated when the fuel is taken into the filter body 41. The two connection portions 43 are connected to the inlets 31 of the two fuel pumps 30, and serve passages through which the fuel that has passed through the filter body 41 is supplied to the fuel pumps 30.

The two arms 44 are made of resin, for example, polyacetal synthetic fabric, or polyamide synthetic fabric, and connect the shape maintaining member 42 to the connection portions 43. One of the arms 44 is formed in an L-shape and extends from a tip of the stem 42*a* that passes the center of each of the branches 42*b*. The other arm 44 is also formed in an L-shape, and extends from the stem 42*a* at a position between the tip of the stem 42*a* and the longitudinal center of the stem 42*a*.

In the first embodiment of the invention, the arms 44 are made of flexible resin and are L-shaped members that extend from the stem 42*a*, as described above. Accordingly, the connection portions 43 are moved more easily when the connection portions 43 are connected to the shape maintaining member 42 with the use of the arms 44 than when each of the connection portions 43 is connected to the shape maintaining member 42 with the use of a member that linearly extends between the connection portion 43 and the shape maintaining member 42 in the shortest distance. Therefore, according to the first embodiment of the invention, the interval between the two connection portions 43 is adjustable within a predetermined interval range. Accordingly, when the suction filter 40 is fitted to the fuel pumps 30, it is possible to adjust the interval between the connection portions 43 in accordance with the interval between the inlets 31. Thus, the suction filter 40 is fitted to the fuel pumps 30 with the interval between the connection portions 43 adjusted. Therefore, it is possible to fit the suction filter 40 to the fuel pumps 30 without changing the interval between the fuel pumps 30 that are held by the fuel pump holding member 20. Accordingly, the O-rings 22 are neither tilted nor twisted. As a result, it is possible to prevent degradation of sealing performance.

Figure 8:
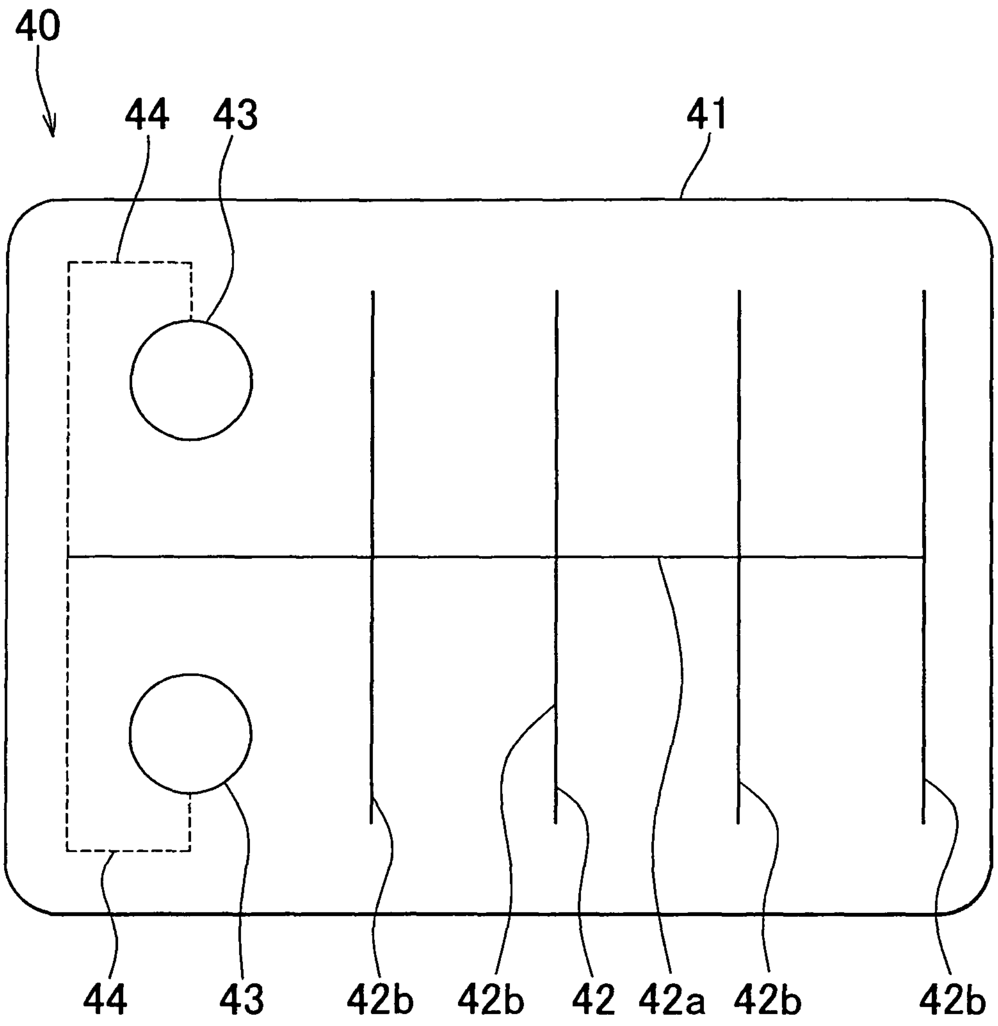
FIG. 8 is a schematic cross-sectional view that shows a suction filter according to a second embodiment of the invention and that is taken along the line VI-VI in FIG. 3.

Hereafter, a second embodiment of the invention will be described with reference to FIG. 8. Note that, portions that are substantially the same as those in the first embodiment of the invention will be denoted by the same reference numerals as those in the first embodiment of the invention. The arms 44 of the suction filter 40 according to the second embodiment of the invention are formed in a hook shape, and extend from the tip of the stem 42*a* outward in the opposite directions. Accordingly, as in the first embodiment of the invention, the connection portions 43 are moved more easily when the connection portions 43 are connected to the shape maintaining member 42 with the use of the arms 44 than when each of the connection portions 43 is connected to the shape maintaining member 42 with the use of a member that linearly extends between the connection portion 43 and the shape maintaining member 42 in the shortest distance. Therefore, according to the second embodiment of the invention, the interval between the two connection portions 43 is adjustable within a predetermined interval range. Accordingly, when the suction filter 40 is fitted to the fuel pumps 30, it is possible to adjust the interval between the connection portions 43 in accordance with the interval between the inlets 31.

Thus, the suction filter 40 is fitted to the fuel pumps 30 with the interval between the connection portions 43 adjusted. Accordingly, it is possible to fit the suction filter 40 to the fuel pumps 30 without changing the interval between the fuel pumps 30 that are held by the fuel pump holding member 20. Therefore, the O-rings 22 are neither tilted nor twisted. As a result, it is possible to prevent degradation of sealing performance.

Figure 9:
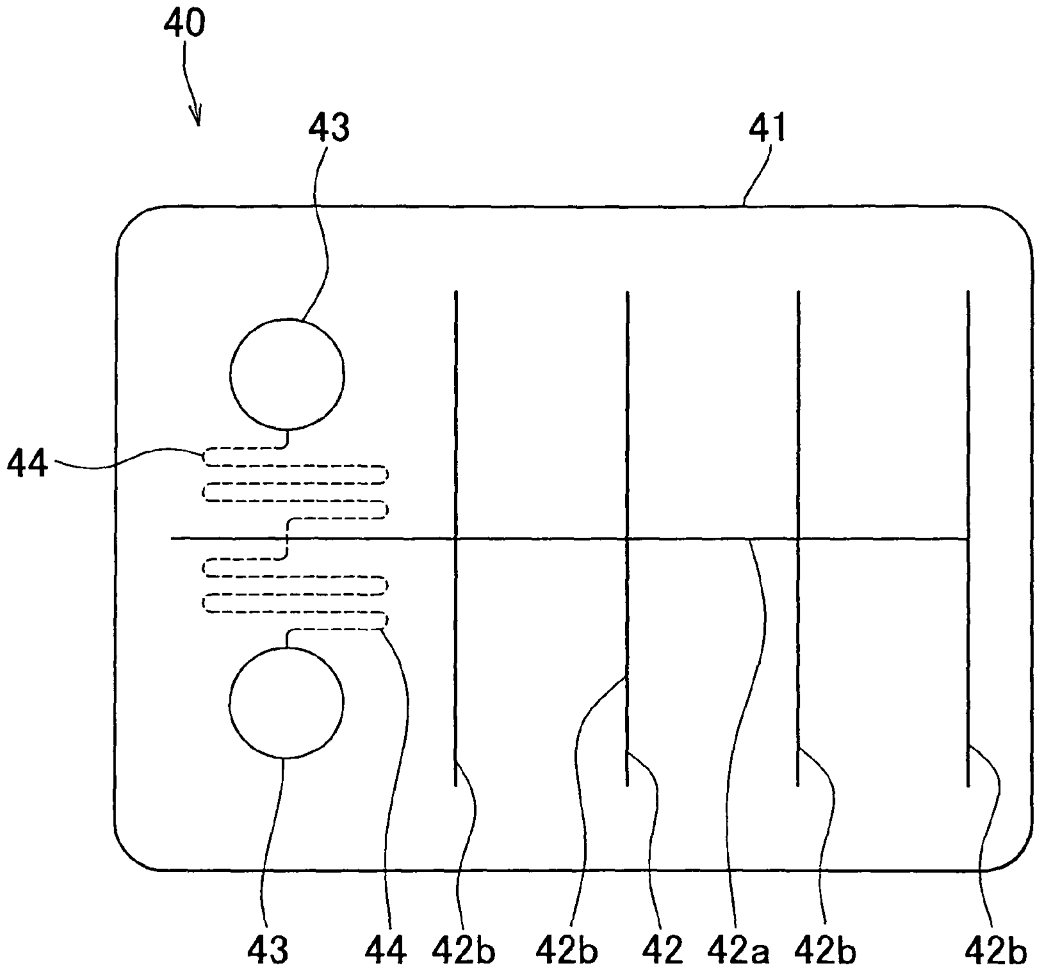
FIG. 9 is a schematic cross-sectional view that shows a suction filter according to a third embodiment of the invention and that is taken along the line VI-VI in FIG. 3.

Hereafter, a third embodiment of the invention will be described with reference to FIG. 9. Note that, portions that are substantially the same as those in the first embodiment of the invention will be denoted by the same reference numerals as those in the first embodiment of the invention. The arms 44 of the suction filter 40 according to the third embodiment of the invention are formed in a spring shape, and extend from the stem 42*a*. Accordingly, as in the first embodiment of the invention, the connection portions 43 are moved more easily when the connection portions 43 are connected to the shape maintaining member 42 with the use of the arms 44 than when each of the connection portions 43 is connected to the shape maintaining member 42 with the use of a member that linearly extends between the connection portion 43 and the shape maintaining member 42 in the shortest distance. Therefore, according to the third embodiment of the invention, the interval between the two connection portions 43 is adjustable within a predetermined interval range. Accordingly, when the suction filter 40 is fitted to the fuel pumps 30, it is possible to adjust the interval between the connection portions 43 in accordance with the interval between the inlets 31.

Thus, the suction filter 40 is fitted to the fuel pumps 30 with the interval between the connection portions 43 adjusted. Accordingly, it is possible to fit the suction filter 40 to the fuel pumps 30 without changing the interval between the fuel pumps 30 that are held by the fuel pump holding member 20. Therefore, the O-rings 22 are neither tilted nor twisted. As a result, it is possible to prevent degradation of sealing performance.

Figure 10:
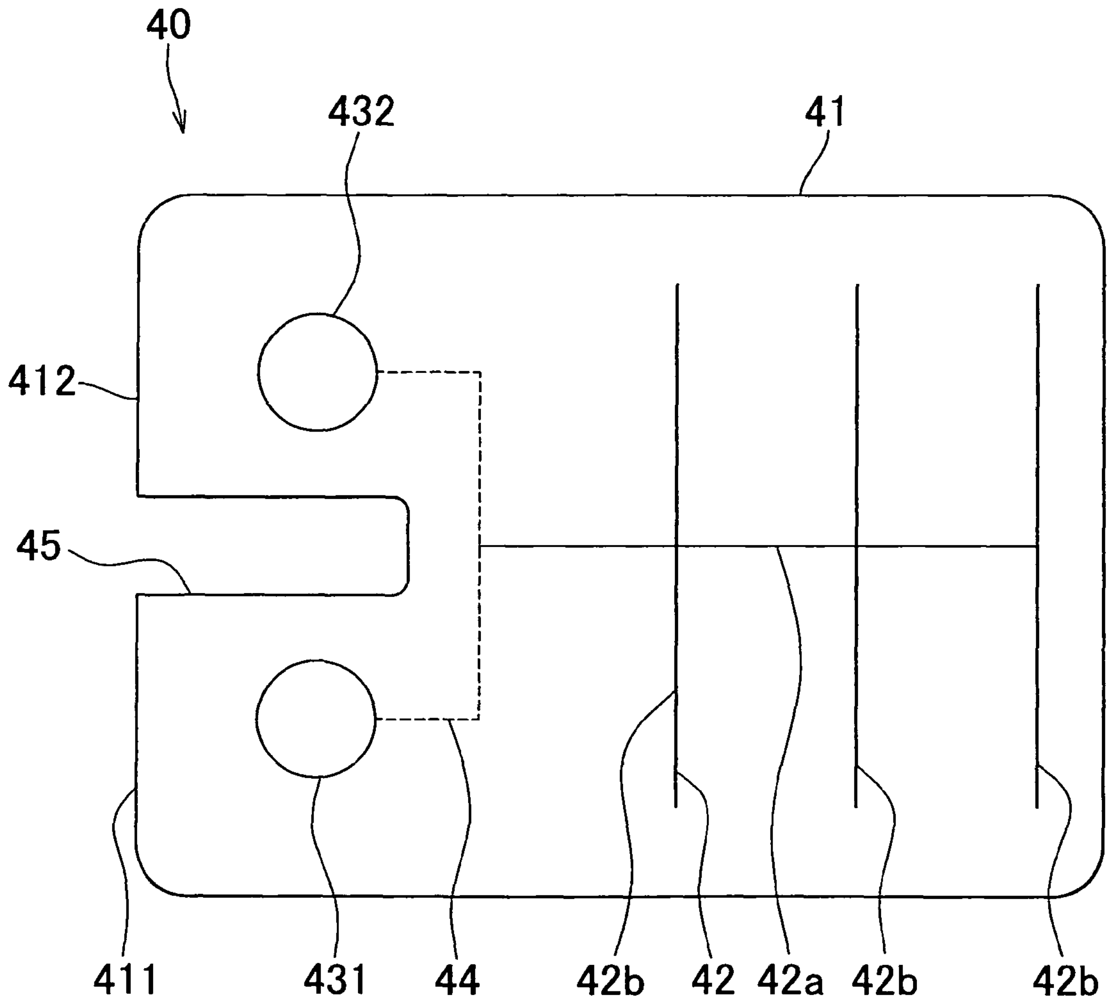
FIG. 10 is a schematic cross-sectional view that shows a suction filter according to a fourth embodiment of the invention and that is taken along the line VI-VI in FIG. 3.
Figure 11A:
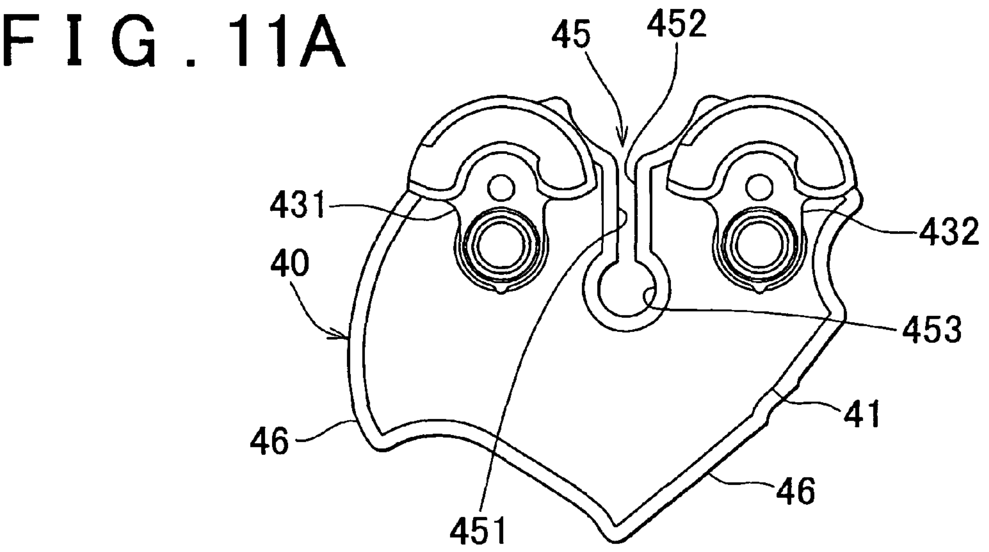
FIG. 11 illustrates views showing the suction filter according to the fourth embodiment of the invention, FIG. 11A being a top plan view of the suction filter, FIG. 11B being a side view of the suction filter, and FIG. 11C being a bottom plan view of the suction filter.
Figure 11B:
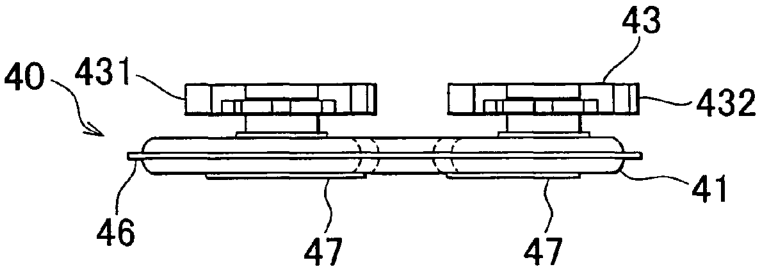
Figure 11C:
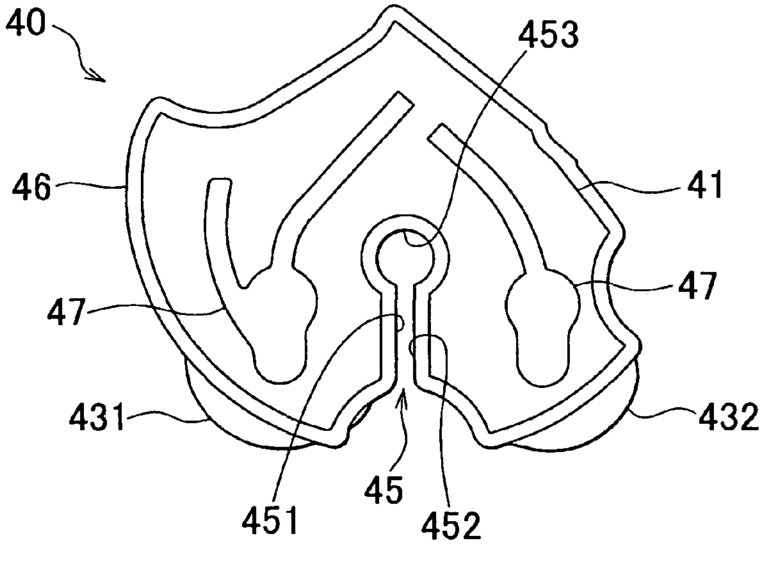

Hereafter, a fourth embodiment of the invention will be described with reference to FIGS. 10 and 11. FIG. 11 shows a tangible form of the suction filter in FIG. 10. Note that, portions that are substantially the same as those in the first embodiment of the invention will be denoted by the same reference numerals as those in the first embodiment of the invention. The filter body 41 of the suction filter 40 according to the fourth embodiment of the invention is in a sac-shape and formed by folding mesh nonwoven fabric made of resin, and the outer periphery of the filter body is closed at a welded portion 46 by thermal welding. Thus, the filter body 41 is sealed. Protection members 47 that prevent abrasion are provided on the bottom face of the filter body 41. The protection members 47 prevent breakage of the filter body 41 due to friction between the filter body 41 and the tank.

The filter body 41 has a bifurcated shape, that is, the filter body 41 has a first leg portion 411 and a second leg portion 412. A first connection portion 431 and a second connection portion 432 are provided on the first leg portion 411 and the second leg portion 412, respectively. A notch 45 is formed between the first leg portion 411 and the second leg portion 412. According to the fourth embodiment of the invention, the first connection portion 431 and the second connection portion 432 are moved with respect to each other more flexibly due to presence of the first leg portion 411 and the second leg portion 412 between which the notch 45 is formed. The notch 45 is defined by straight portions 451 and 452 and a deepest portion 453 that connects the deepest points of the straight portions 451 and 452 to each other. Because the deepest portion 453 that partially defines the notch 45 is formed in an are-shape, it is possible to avoid stress concentration that is likely to occur when the two connection portions 431 and 432 are moved. Thus, breakage of the filter body 41 is prevented. Accordingly, when the suction filter 40 is fitted to the fuel pumps 30, the interval between the connection portions 431 and 432 is adjusted relatively easily in accordance with the interval between the inlets 31.

Thus, the suction filter 40 is fitted to the fuel pumps 30 with the interval between the connection portions 431 and 432 adjusted. Accordingly, it is possible to fit the suction filter 40 to the fuel pumps 30 without changing the interval between the fuel pumps 30 that is held by the fuel pump holding member 20. Therefore, the O-rings 22 are neither tilted nor twisted. As a result, it is possible to prevent degradation of sealing performance.

Hereafter, other embodiments of the invention will be described. A fuel supply system according to the invention may be a hanging type or a cup type. The shapes of the suction filter and the arms are not particularly limited as long as the suction filter and the arms are formed in such a manner that the connection portions are movable. For example, the arms may be curved, or one arm may be formed of a plurality of small arms that are connected to each other with joints. For example, one arm may be formed of an upper arm that is connected to the shape maintaining member and a front arm that is connected to the connection portion. The upper arm and the front arm may be movably connected to each other with a joint. As the joint, a hinge or a spring may be used. However, any member may be used as the joint as long as the member has the function of adjusting the interval between the connection portions.

In the embodiments of the invention described above, the arms are used as the interval adjusting members. However, the interval adjusting members are not particularly limited as long as the interval adjusting members are able to adjust the interval between the connection portions. As described above, the invention is not limited to the example embodiments described above, and the invention is intended to cover various modifications and equivalent arrangements within the scope of the invention.

What is claimed is:

1. A fuel supply system, comprising:

a plurality of fuel pumps each of which is provided with a pump inlet through which fuel is drawn up into the fuel pump and a pump outlet through which the fuel is discharged from the fuel pump;

a fuel pump holding member that has a fuel chamber in which flows of the fuel discharged from the pump outlets of the fuel pumps are merged together and a fuel passage which is communicated with the fuel chamber and through which the fuel is discharged externally, and that holds the fuel pumps in such a manner that the pump outlets are located at predetermined intervals; and one suction filter that includes:

a filter body which removes foreign matter from the fuel drawn up from a fuel tank, a shape maintaining member which is housed in the filter body and which maintains a shape of the filter body, a plurality of connection portions through which the fuel that has passed through the filter body is supplied to the pump inlets and which are connected to the pump inlets of the fuel pumps, and an interval adjusting member which adjusts an interval between the connection portions in accordance with an interval between the pump inlets, which is determined when the interval between the pump outlets is defined by the fuel pump holding member, wherein the interval adjusting member is a nonlinear, resilient arm that is located inside the filter body.

2. The fuel supply system according to claim 1, wherein the interval adjusting member includes a first interval adjusting member that connects one of the connection portions of the suction filter to the shape maintaining member.

3. The fuel supply system according to claim 2, wherein:

the interval adjusting member includes a second interval adjusting member that connects one of the connection portions of the suction filter to the shape maintaining member, and which is on an opposite side of the shape maintaining member from the connection portion that is connected to the shape maintaining member via the first interval adjusting member.

4. The fuel supply system according to claim 1, wherein the arm is formed into a specific shape that is selected in such a manner that a portion of the arm, which is between the connection portion and the shape maintaining member, is longer than the shortest distance between the connection portion and the shape maintaining member.

5. The fuel supply system according to claim 4, wherein the arm is formed into an L-shape.

6. The fuel supply system according to claim 4, wherein the arm is formed into a hook shape.

7. The fuel supply system according to claim 4, wherein the arm is formed into a spring shape.

8. The fuel supply system according to claim 1, wherein the arm is formed into an L-shape.

9. The fuel supply system according to claim 1, wherein the arm is formed into a hook shape.

10. The fuel supply system according to claim 1, wherein the arm is formed into a spring shape.

11. The fuel supply system according to claim 1, wherein the arm is made of flexible material.

12. The fuel supply system according to claim 11, wherein the arm is formed into a specific shape that is selected in such a manner that a portion of the arm, which is between the connection portion and the shape maintaining member, is longer than the shortest distance between the connection portion and the shape maintaining member.

13. The fuel supply system according to claim 12, wherein the arm is formed into an L-shape.

14. The fuel supply system according to claim 12, wherein the arm is formed into a hook shape.

15. The fuel supply system according to claim 12, wherein the arm is formed into a spring shape.

16. The fuel supply system according to claim 1, wherein the arm is formed of a plurality of small arms, and the adjacent small arms are movably connected to each other with a joint.

17. The fuel supply system according to 16, wherein the arm is made of flexible material.

18. The fuel supply system according to claim 1, wherein:

the suction filter has a first leg portion and a second leg portion; and a notch that promotes adjustment of the interval between the connection portions is formed between the first leg portion and the second leg portion.

19. The fuel supply system according to claim 18, wherein the interval adjusting member is made of flexible material.

* * * * *

UNITED STATES PATENT AND TRADEMARK OFFICE

CERTIFICATE OF CORRECTION

PATENT NO. : 8,453,622 B2
APPLICATION NO. : 12/382397
DATED : June 4, 2013
INVENTOR(S) : Shin Iwaoka et al.

It is certified that error appears in the above-identified patent and that said Letters Patent is hereby corrected as shown below:

On the title page, item 75, please change the Inventor's Address from "Kariya, Okazaki, Kariya" to -- Kariya-shi, Okazaki-shi, Kariya-shi --.

Please also change item 73, the Assignee, from "Kyosan Denki Co., Ltd., Koga (JP)" to -- Kyosan Denki Co., Ltd., Koga City (JP) --.

Signed and Sealed this
Twenty-sixth Day of November, 2013

Margaret A. Focarino

*Commissioner for Patents of the United States Patent and Trademark Office*